(12) United States Patent
Komatsu et al.

(10) Patent No.: US 12,202,252 B2
(45) Date of Patent: Jan. 21, 2025

(54) DRIVE TRANSMISSION DEVICE, MEDIUM TRANSPORT DEVICE, AND RECORDING DEVICE

(71) Applicant: SEIKO EPSON CORPORATION, Tokyo (JP)

(72) Inventors: Yuki Komatsu, Shiojiri (JP); Yuko Taniue, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 182 days.

(21) Appl. No.: 18/047,883

(22) Filed: Oct. 19, 2022

(65) Prior Publication Data

US 2023/0120572 A1    Apr. 20, 2023

(30) Foreign Application Priority Data

Oct. 19, 2021   (JP) ................... 2021-170800

(51) Int. Cl.
| | | |
|---|---|---|
| *B41J 11/00* | (2006.01) | |
| *B65H 5/06* | (2006.01) | |
| *F16H 7/02* | (2006.01) | |
| *F16H 7/08* | (2006.01) | |
| *F16H 7/12* | (2006.01) | |

(52) U.S. Cl.
CPC .............. *B41J 11/007* (2013.01); *B65H 5/06* (2013.01); *F16H 7/02* (2013.01); *F16H 7/1281* (2013.01); *B65H 2403/20* (2013.01); *F16H 2007/0865* (2013.01); *F16H 2007/0893* (2013.01); *F16H 2007/0897* (2013.01)

(58) Field of Classification Search
CPC ........... B41J 11/007; B41J 13/08; B65H 5/06; B65H 2403/20; B65H 2801/06; F16H 7/02; F16H 7/1281; F16H 2007/0865; F16H 2007/0893; F16H 2007/0897
USPC .......................................................... 347/104
See application file for complete search history.

(56) References Cited

U.S. PATENT DOCUMENTS 4,708,697 A * 11/1987 Foster ................... F16H 7/1236
                                                            474/135
2009/0074492 A1   3/2009 Ito
2015/0125198 A1*  5/2015 Sekigawa .............. B65H 31/26
                                                            399/407

FOREIGN PATENT DOCUMENTS

| JP | H11109697 A | 4/1999 |
|---|---|---|
| JP | 2003246483 A | 9/2003 |
| JP | 2006065056 A | 3/2006 |
| JP | 2006076730 A | 3/2006 |
| JP | 2009069753 A | 4/2009 |
| JP | 2013246220 A | 12/2013 |
| JP | 2014145829 A | 8/2014 |

(Continued)

*Primary Examiner* — Jason S Uhlenhake
*Assistant Examiner* — Alexander D Shenderov
(74) *Attorney, Agent, or Firm* — CHIP LAW GROUP (57) ABSTRACT

A drive transmission device includes a plurality of pulleys including three or more pulleys, and an endless belt stretched over the plurality of pulleys and in which a plurality of linear belt sections each formed between two of the pulleys are formed, wherein a first flange is provided on a first pulley which is the pulley that forms a longest belt section and does not form a shortest belt section among the plurality of belt sections, and a gap between the first flange and a side surface of the endless belt is smaller than a gap between a flange provided on another pulley and the side surface of the endless belt.

14 Claims, 6 Drawing Sheets

(56) References Cited

FOREIGN PATENT DOCUMENTS

JP 2015011523 A 1/2015

\* cited by examiner

DRIVE TRANSMISSION DEVICE, MEDIUM TRANSPORT DEVICE, AND RECORDING DEVICE

The present application is based on, and claims priority from JP Application Serial Number 2021-170800, filed Oct. 19, 2021, the disclosure of which is hereby incorporated by reference herein in its entirety.

BACKGROUND

1. Technical Field

The present disclosure relates to a drive transmission device that transmits power of a drive source to an endless belt. The present disclosure relates to a medium transport device equipped with the drive transmission device. Furthermore, the present disclosure relates to a recording device including the medium transport device or the drive transmission device.

2. Related Art

A drive transmission device that drives an endless belt stretched over at least two pulleys is used for various devices including an office machine represented by a facsimile, a printer, or the like. JP 2003-246483 A discloses an image forming apparatus that is an example of such a device.

Since tension is given to the endless belt to suppress loosening, in any of a plurality of pulleys over which the endless belt is applied, a rotation shaft of the pulley may be deformed, and the endless belt may move in an axial direction.

When a flange is provided in the pulley in order to prevent the endless belt from being separated from the pulley, the endless belt is strongly brought into contact with the flange as the endless belt moves in the axial direction, and stress concentration may occur and cause a rupture of the endless belt. However, when the flange is not provided, the endless belt may be separated from the pulley.

SUMMARY

In order to solve the problem described above, a drive transmission device according to the present disclosure includes a plurality of pulleys including three or more pulleys, and an endless belt stretched over the plurality of pulleys and in which a plurality of linear belt sections each formed between two of the pulleys are formed, wherein a first flange is provided on a first pulley which is the pulley that forms a longest belt section and does not form a shortest belt section among the plurality of belt sections, and the first flange restricts movement of the endless belt in an axial direction of the pulley when the endless belt rotates.

Further, a drive transmission device according to the present disclosure includes a plurality of pulleys including three or more pulleys, and an endless belt stretched over the plurality of pulleys and in which a plurality of linear belt sections each formed between two of the pulleys are formed, wherein a first flange is provided on a first pulley which is the pulley that forms a longest belt section and does not form a shortest belt section among the plurality of belt sections, and a gap between the first flange and a side surface of the endless belt is smaller than a gap between a flange provided on any other pulley and the side surface of the endless belt.

Further, a medium transport device according to the present disclosure includes any one of the drive transmission devices, and at least one roller configured to transport a medium and driven by the one of the drive transmission devices.

Furthermore, a recording device according to the present disclosure includes a recording part configured to perform recording on a medium, and any one of the drive transmission devices, and at least one roller configured to transport a medium and driven by the one of the drive transmission devices.

DESCRIPTION OF EXEMPLARY EMBODIMENTS

Hereinafter, the present disclosure will be schematically described.

A drive transmission device according to a first aspect includes a plurality of pulleys including three or more pulleys, and an endless belt stretched over the plurality of pulleys and in which a plurality of linear belt sections each formed between two of the pulleys are formed, wherein a first flange is provided on a first pulley which is the pulley that forms a longest belt section and does not form a shortest belt section among the plurality of belt sections, and a gap between the first flange and a side surface of the endless belt is smaller than a gap between a flange provided on any other pulley and the side surface of the endless belt. That is, the gap between the first flange and the side surface of the endless belt is smaller than a smallest gap among the gaps between the flanges provided on the other pulleys and the side surface of the endless belt.

As a length of the belt section in the endless belt becomes shorter, the endless belt more strongly comes into contact with the flange, and the endless belt more easily ruptures when the flange is formed on the pulley forming the belt section.

However, according to the present aspect, since the first flange that has the smallest gap from the side surface of the endless belt, that is, the first flange that restricts movement of the endless belt in an axial direction when the endless belt rotates is provided on the first pulley which is the pulley that forms the longest belt section and does not form the shortest belt section among the plurality of belt sections, a force with which the endless belt comes into contact with the first flange can be suppressed, and thus the movement of the endless belt in the axial direction can be restricted while the rupture of the endless belt is suppressed. The fact that the first flange restricts the movement of the endless belt means that the first flange contributes most to the restriction of the movement of the endless belt and means that another flange may be in contact with the endless belt.

A drive transmission device according to a second aspect includes a plurality of pulleys including three or more pulleys, and an endless belt stretched over the plurality of pulleys and in which a plurality of linear belt sections each formed between two of the pulleys are formed, wherein a first flange is provided on a first pulley which is the pulley that forms a longest belt section and does not form a shortest belt section among the plurality of belt sections, and the first flange restricts movement of the endless belt in an axial direction of the pulley when the endless belt rotates.

As a length of the belt section in the endless belt becomes shorter, the endless belt more strongly comes into contact with the flange, and the endless belt more easily ruptures when the flange is formed on the pulley forming the belt section.

However, according to the present aspect, since the first flange that restricts movement of the endless belt in an axial direction when the endless belt rotates is provided on the first pulley which is the pulley that forms the longest belt section and does not form the shortest belt section among the plurality of belt sections, a force with which the endless belt comes into contact with the first flange can be suppressed, and thus the movement of the endless belt in the axial direction can be restricted while rupture of the endless belt is suppressed.

According to a third aspect, in the first or second aspects, the first pulley forms the longest belt section and a next longest belt section among the plurality of belt sections.

According to this aspect, since the first pulley forms the longest belt section and the next longest belt section among the plurality of belt sections, a force with which the endless belt comes into contact with the first flange can be further suppressed, and thus the rupture of the endless belt can be suppressed more reliably.

According to a fourth aspect, in any one of the first to third aspects, an outer diameter of the first pulley may be larger than a minimum outer diameter in the plurality of pulleys.

As the outer diameter of the pulley becomes smaller, a region in which stress is generated in the endless belt when the endless belt comes into contact with the first flange is reduced in size, that is, stress concentration is more likely to occur, and thus, the endless belt is more likely to rupture.

According to the aspect, since the outer diameter of the first pulley is larger than the minimum outer diameter in the plurality of pulleys, rupture of the endless belt due to the stress concentration described above can be suppressed.

According to a fifth aspect, in the fourth aspect, the outer diameter of the first pulley is greater than or equal to an outer diameter of any other pulley. That is, the outer diameter of the first pulley is a maximum outer diameter in the plurality of pulleys.

According to the aspect, since the outer diameter of the first pulley is the maximum outer diameter in the plurality of pulleys, the rupture of the endless belt due to the stress concentration described above can be more reliably suppressed.

According to a sixth aspect, in the first to fifth aspects, the drive transmission device further includes a second pulley configured to constitute the plurality of pulleys and to form the longest belt section together with the first pulley, a first rotation shaft configured as a rotation shaft of the first pulley and in which the first pulley is provided on a shaft end, a second rotation shaft configured as a rotation shaft of the second pulley and in which the second pulley is provided on a shaft end, a first bearing part configured to receive the first rotation shaft, and a second bearing part configured to receive the second rotation shaft, wherein at least one of the shaft end of the first rotation shaft on which the first pulley is provided and the shaft end of the second rotation shaft on which the second pulley is provided is a free end.

At least one of the shaft end of the first rotation shaft in which the first pulley is provided and the shaft end of the second rotation shaft at which the second pulley is provided is a free end and has a so-called cantilever structure, and at least one of the first rotation shaft and the second rotation shaft tends to be bent toward inside of the endless belt due to tension of the endless belt. In this way, when at least one of the first rotation shaft and the second rotation shaft is bent, the pulley provided on the bent rotation shaft is inclined toward inside of the endless belt, and the endless belt moves in the axial direction. Due to the movement of the endless belt, the endless belt strongly comes into contact the flange provided on the pulley, and the rupture of the endless belt easily occurs, but due to the first or second aspect described above, the movement of the endless belt in the axial direction can be restricted while the rupture of the endless belt is suppressed.

According to a seventh aspect, in the sixth aspect, the shaft end of the first rotation shaft, on which the first pulley is provided, is a free end and the shaft end of the second rotation shaft, on which the second pulley is provided, is a free end.

According to the aspect, both the first rotation axis and the second rotational axis have a cantilever structure, and both have a structure that easily bends toward inside of the endless belt. Accordingly, both the first pulley and the second pulley are inclined toward the inside of the endless belt, the endless belt is more likely to move easily in the axial direction, and the rupture of the endless belt described above is more likely to occur. However, according to the first or second aspect described above, the movement of the endless belt in the axial direction can be restricted while the rupture of the endless belt is suppressed.

According to an eighth aspect, in the sixth or seventh aspect, the plurality of pulleys includes a third pulley that applies tension to the endless belt and is adjacent to the second pulley, and a fourth pulley provided on a driving shaft of a motor and is adjacent to the third pulley and the first pulley, the length of the belt section increases from the belt section between the third pulley and the fourth pulley, the belt section between the second pulley and the third pulley, the belt section between the first pulley and the fourth pulley, and the belt section between the first pulley and the second pulley in this order, the outer diameters of the first pulley and the second pulley are larger than an outer diameter of the third pulley, the outer diameter of the third pulley is larger than an outer diameter of the fourth pulley, a second flange that faces the side surface of the endless belt is provided on the second pulley, a third flange that faces the side surface of the endless belt is provided on the third pulley, and both the gap between the first flange and the side surface of the endless belt and the gap between the second flange and the side surface of the endless belt are smaller than a gap between the third flange and the side surface of the endless belt.

According to the aspect, since the first pulley and the second pulley form the longest belt section, and both the gap between the first flange and the side surface of the endless belt and the gap between the second flange and the side surface of the endless belt are smaller than the gap between the third flange and the side surface of the endless belt, the force with which the endless belt comes into contact with the first flange and the force with which the endless belt comes into contact with the second flange can be suppressed, and thus the movement of the endless belt in the axial direction can be restricted while the rupture of the endless belt at each flange is suppressed.

In the specification, the fact that two pulleys are adjacent to each other means that the two pulleys form a linear belt section, regardless of the distance between the two pulleys.

A drive transmission device according to a ninth aspect includes a driving pulley driven by a drive source, a plurality of driven pulleys, the plurality of driven pulleys including a first pulley, a second pulley adjacent to the first pulley, and a third pulley adjacent to the second pulley, an endless belt stretched over the driving pulley and the plurality of driven pulleys, a first rotation shaft configured as a rotation shaft of the first pulley and in which the first pulley is provided on a shaft end, a second rotation shaft configured as a rotation shaft of the second pulley and in which the second pulley is provided on a shaft end, a first bearing part configured to receive the first rotation shaft, and a second bearing part configured to receive the second rotation shaft, wherein a shaft end of the first rotation shaft on which the first pulley is provided is a free end, a shaft end of the second rotation shaft on which the second pulley is provided is a free end, the first pulley has a first flange that faces a side surface of the endless belt, the second pulley has a second flange that faces the side surface of the endless belt, the third pulley has a third flange that faces the side surface of the endless belt, the third pulley is provided to be displaceable in an axial direction, and a force with which the endless belt comes into contact with the third flange when the endless belt rotates is smaller than a force with which the endless belt comes into contact with the first flange and a force with which the endless belt comes into contact with the second flange. That is, since the third pulley is provided to be displaceable in the axial direction, the force with which the endless belt comes into contact with the third flange when the endless belt rotates is smaller than the force with which the endless belt comes into contact with the first flange and the force with which the endless belt comes into contact with the second flange.

Since the shaft end of the first rotation shaft at which the first pulley is provided is a free end, and the shaft end of the second rotation shaft at which the second pulley is provided is a free end, both the first rotation shaft and the second rotation shaft have a so-called cantilever structure and thus have a structure in which the first and second rotation shafts are easily bent toward the inside of the endless belt due to the tension of the endless belt. When the first rotation shaft and the second rotation shaft are bent in this way, the first pulley and the second pulley are inclined toward the inside of the endless belt, and the endless belt moves in the axial direction. Then, due to such movement of the endless belt, the endless belt strongly comes into contact with the flange provided in the third pulley, and thus the rupture of the endless belt easily occurs. However, since the third pulley is displaceable in the axial direction, and thus the force with which the endless belt comes into contact with the third flange when the endless belt rotates is smaller than the force with which the endless belt comes into contact with the first flange and the force with which the endless belt comes into contact with the second flange, the rupture of the endless belt can be suppressed.

A drive transmission device according to another aspect includes a plurality of pulleys including three or more pulleys, and an endless belt stretched over the plurality of pulleys and in which a plurality of linear belt sections each formed between two of the pulleys are formed, wherein the pulley that forms a shortest belt section and does not form a longest belt section among the plurality of belt sections is provided as a displacement pulley to be displaceable in an axial direction, and due to displacement of the displacement pulley, a force with which the endless belt comes into contact with a flange provided on the displacement pulley when the endless belt rotates is smaller than a force with which the endless belt comes into contact with a flange provided on another pulley.

As a length of the belt section in the endless belt becomes shorter, the endless belt more strongly comes into contact with the flange, and the endless belt more easily ruptures when the flange is formed on the pulley forming the belt section.

However, according to the aspect, since the pulley that forms a shortest belt section and does not form a longest belt section among the plurality of belt sections is provided to be displaceable in an axial direction, and due to displacement of the displacement pulley, the force with which the endless belt comes into contact with the flange provided on the displacement pulley when the endless belt rotates is smaller than the force with which the endless belt comes into contact with a flange provided on another pulley, and rupture of the endless belt may be suppressed.

A medium transport device according to an tenth aspect includes the drive transmission device according to any one of the first to tenth aspects, and at least one roller configured to transport a medium and driven by the drive transmission device.

According to the aspect, in the medium transport device, an operation effect of any of the above-described first to tenth aspects can be obtained.

A recording device according to a eleventh aspect includes a recording part configured to perform recording on a medium, and the medium transport device according to the eleventh aspect.

According to the aspect, in the recording device, an operation effect of any of the above-described first to eleventh aspects can be obtained.

A recording device according to a twelfth aspect includes a recording part configured to perform recording on a medium, the drive transmission device according to any of the sixth to ninth aspects, an upstream roller driven by the second pulley of the drive transmission device and located upstream of the recording part in a medium transport path, and a downstream roller driven by the first pulley of the drive transmission device and located downstream of the recording part in the medium transport path.

According to the present aspect, in the recording device including the upstream roller driven by the second pulley of the drive transmission device, and the downstream roller driven by the first pulley of the drive transmission device, the operation effect of any of the sixth to eighth aspects described above is obtained.

Hereinafter, the present disclosure will be specifically described.

In each of the drawings, an X-axis direction is a device width direction and is also a direction intersecting a medium transport direction, that is, a medium width direction. A Y-axis direction is a device depth direction, a −Y direction is a direction from a front surface of the device toward a rear surface of the device, and a +Y direction is a direction from the rear surface of the device toward the front surface of the device. Also, a Z-axis direction is a vertical direction, a +Z direction is upward in the vertical direction, and a −Z direction is downward in the vertical direction.

Figure 1:
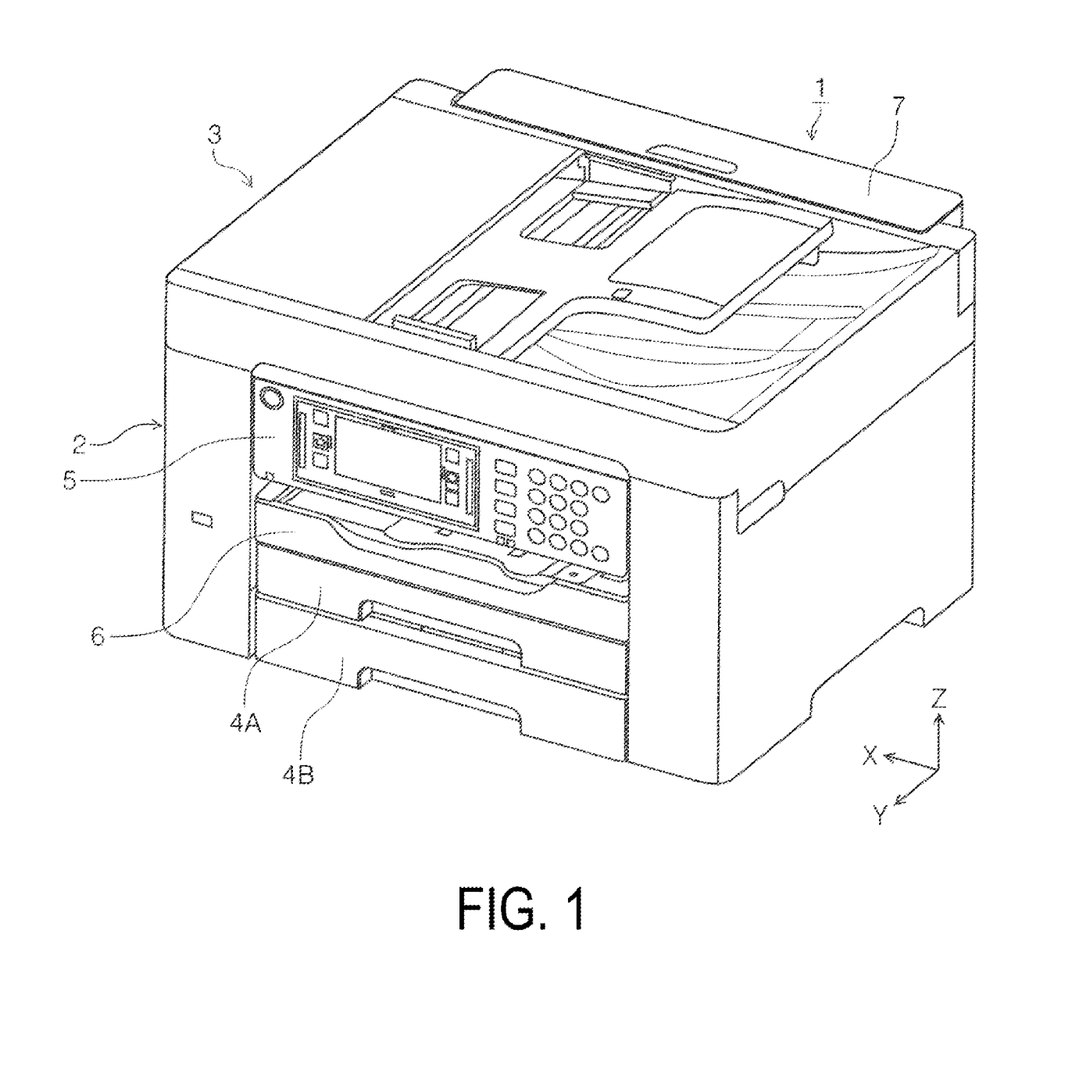
FIG. 1 is an outer perspective view illustrating an inkjet printer.

In FIG. 1, an ink jet printer 1 which is an example of a recording device is a so-called multifunction device that includes a scanner part 3 on an upper portion of a device main body 2. Hereinafter, the term for an inkjet printer is abbreviated as "printer".

The device main body 2 has a function of recording on a medium represented by recording paper, and the scanner part 3 has a function of reading a document.

The device main body 2 includes two medium accommodation cassettes 4A and 4B detachably attached to the front of the device.

Further, the device main body 2 is configured so that a medium can be set and fed from an upper rear portion of the device. In FIG. 1, a reference numeral 7 is a cover configured to open and close a medium setting port (not illustrated) when the medium is set from the upper portion of the device.

The device main body 2 includes an operation part 5, which performs various operations of the printer 1, on a front surface of the device. The operation part 5 includes a display part and a plurality of operation buttons, and is provided to be tiltable.

On the side below the operation part 5, a discharge tray 6 that receives a medium that is discharged after recording is performed thereon is provided to be able to be pulled out of the device main body 2.

Next, the medium transport path of the device main body 2 will be described with reference to FIG. 2.

In the printer 1, the medium is transported to a transport driving roller 16 via a reverse roller 21 that constitutes a reverse path RR regardless of a feeding path. Additionally, the medium is transported to a recording region by a recording head 9 by the transport driving roller 16.

More specifically, the printer 1 includes a medium feeding path K1 for feeding a medium from the medium accommodation cassette 4A as a medium feeding path, a medium feeding path K2 for feeding a medium from the medium accommodation cassette 4B (not illustrated in FIG. 2) under the medium accommodation cassette 4A, and a medium feeding path K3 for manually feeding a medium from a rear upper portion of the device.

Furthermore, the printer 1 includes a first medium transport path FR1, the reverse path RR, a second medium transport path FR2, and a third medium transport path FR3 as the medium transport paths.

The first medium transport path FR1 is a medium transport path that faces the recording head 9, and can transport a medium in the +Y direction that is a medium transport direction when recording is performed on the medium, and the −Y direction opposite thereto. In the present embodiment, the first medium transport path FR1 is a medium transport path between the transport driving roller 16 and a first discharge driving roller 23.

The reverse path RR is a path for reversing a surface of a medium. In the present embodiment, the reverse path RR is a medium transport path between a driven roller 14a and a driven roller 14c.

Further, the second medium transport path FR2 is a path for guiding a medium on which the recording is performed to the reverse path RR. In the present embodiment, the second medium transport path FR2 is a path passing through the driven roller 14d and is a medium transport path between the transport driving roller 16 and the driven roller 14a.

The third medium transport path FR3 is a path that is located vertically downward with respect to the second medium transport path FR2 and guides the medium on which the recording is performed to the reverse path RR. In the present embodiment, the third medium transport path FR3 is a path passing through a reverse driving roller 25 and is a medium transport path between a second discharge driving roller 27 and the driven roller 14a.

Figure 2:
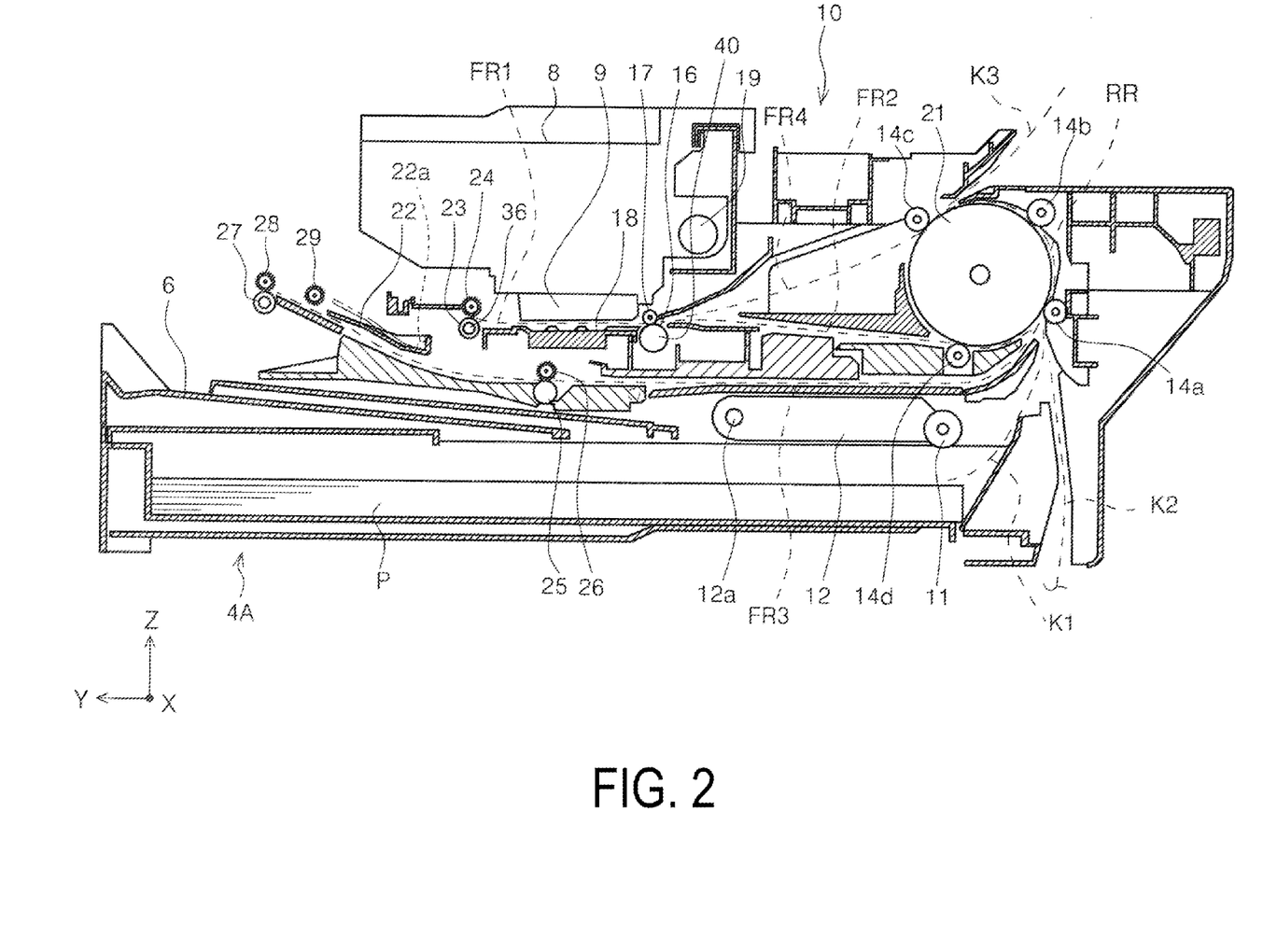
FIG. 2 is a diagram illustrating a medium transport path in the ink jet printer.

A reference numeral FR4 in FIG. 2 is a medium transport path between the driven roller 14c and the transport driving roller 16. Hereinafter, the medium transport path is referred to as a fourth medium transport path FR4.

In the medium feeding path K1, a medium is fed by a feeding roller 11 driven by a motor (not illustrated). The feeding roller 11 is supported by a support member 12 that swings about a swing shaft 12a, and the swing of the support member 12 causes the feeding roller 11 to move forward and backward with respect to the medium accommodated in the medium accommodation cassette 4A. A reference sign P indicates a medium accommodated in the medium accommodation cassette 4A.

The reverse roller 21 located downstream of the feeding roller 11 is formed to have the largest diameter compared to other rollers, and bends and reverses the medium. The driven rollers 14a, 14b, 14c, and 14d are provided around the reverse roller 21. The medium fed through the medium feeding paths K1 and K2 is sent to the transport driving roller 16 via the reverse path RR and the fourth medium transport path FR4.

The medium fed through the medium feeding path K3 is sent to the transport driving roller 16 via the fourth medium transport path FR4.

The medium sent in the −Y direction via the second medium transport path FR2 is sent to the transport driving roller 16 via the reverse path RR and the fourth medium transport path FR4.

Similarly, the medium sent in the −Y direction via the third medium transport path FR3 is sent to the transport driving roller 16 via the reverse path RR and the fourth medium transport path FR4.

The medium sent to the transport driving roller 16 driven by a drive source (not shown) is nipped by the transport driving roller 16 and a transport driven roller 17 that is driven and rotated, and is sent to a region that faces the recording head 9, that is, a recording region, and the recording is performed thereon.

A carriage 8 equipped with the recording head 9 reciprocates in the X-axis direction by a power source (not illustrated) while being guided by a carriage guide shaft 19 that extends in the X-axis direction. The recording head 9 which is an example of a recording part discharges ink on the medium in accordance with a movement operation of the carriage 8.

A medium support member 18 is provided at a position facing the recording head 9, and the medium on which the recording is performed by the recording head 9 is supported by the medium support member 18.

A first discharge driving roller 23 that is rotationally driven and a first discharge driven roller 24 that is driven and rotated are provided downstream of the medium support member 18.

A driven roller 29 is provided downstream of the first discharge driving roller 23, and a second discharge driving roller 27 that is rotationally driven and a second discharge driven roller 28 that is driven and rotated are provided further downstream thereof.

In the printer 1 having the medium feeding path and the medium transport path, the feeding roller 11 and the reverse roller 21 are driven by a motor (not illustrated), and the transport driving roller 16 and the first discharge driving roller 23 are driven by a motor 31 (refer to FIG. 4), and the second discharge driving roller 27 and the reverse driving roller 25 are driven by a motor (not illustrated).

When the recording is performed on a second surface on the side opposite to a first surface of a medium on which the recording has been performed, the medium on which the recording has been performed is sent to the reverse path RR. In the present embodiment, any of the second medium transport path FR2 and the third medium transport path FR3 can be selected as the medium transport path at that time. A flap 22 that is swingable about the swing shaft 22a switches a transport destination of the medium to any of the second medium transport path FR2 and the third medium transport path FR3.

The transport driving roller 16 is an example of an upstream roller, and the first discharge driving roller 23 is an example of a downstream roller. The first discharge driving roller 23 is provided on a first rotation shaft 36, and the transport driving roller 16 is provided on a second rotation shaft 40. The first rotation shaft 36 and the second rotation shaft 40 constitute a drive transmission device 30 which will be described below.

Further, the transport driving roller 16 and the first discharge driving roller 23 constitute a medium transport device 10. From the viewpoint of transporting the medium, the printer 1 can be referred to as a medium transport device as a whole.

The medium transport path of the printer 1 has been described above, and the drive transmission device 30 will be described below with reference to FIG. 3 and the like.

The drive transmission device 30 is a device that transmits power of the motor 31 to an endless belt 47 and includes a plurality of pulleys including three or more pulleys; and the endless belt 47 that is stretched over the plurality of pulleys, and the pulleys and the endless belt 47 are the minimum components.

Figure 3:
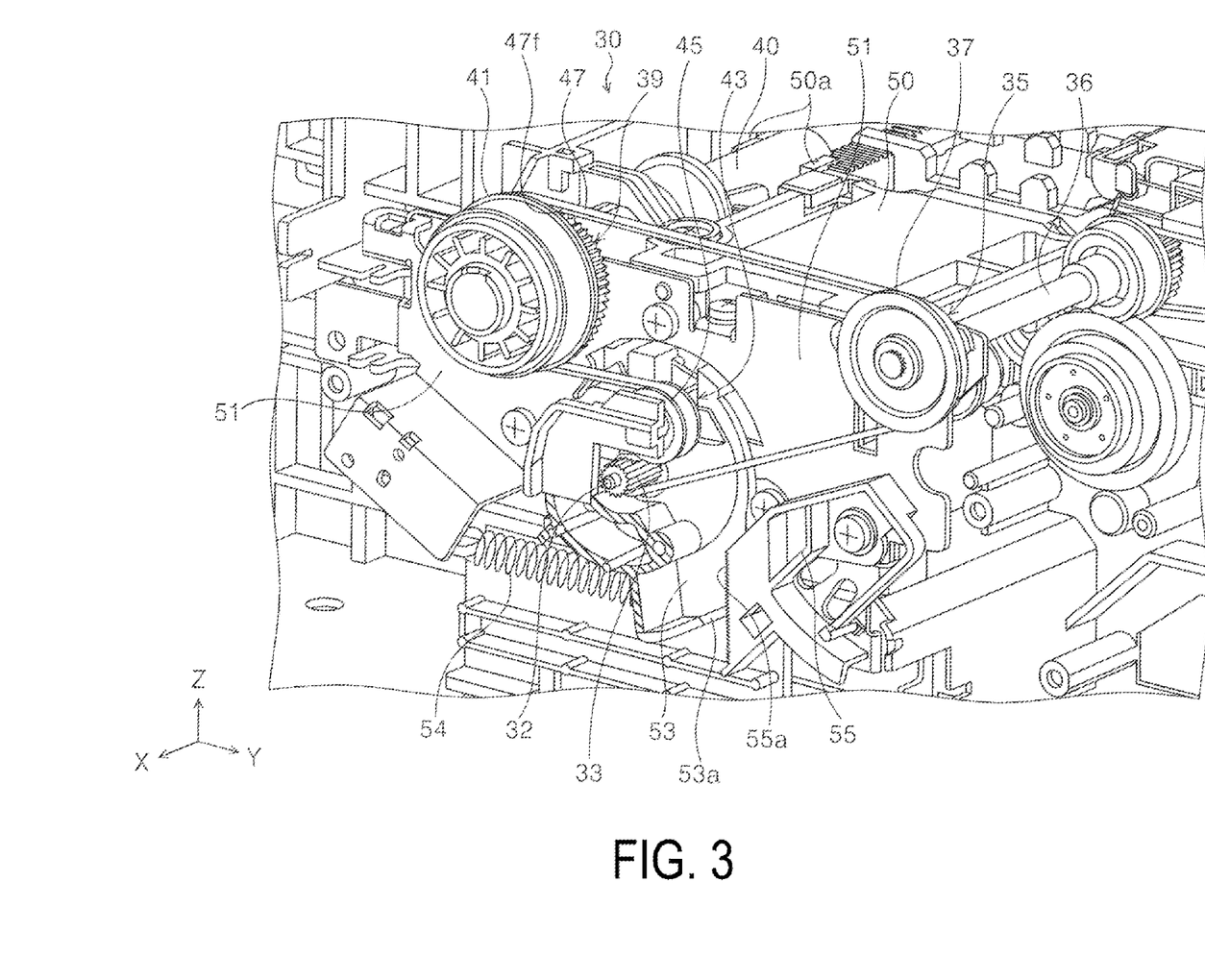
FIG. 3 is a perspective view of a power transmission mechanism.
Figure 4:
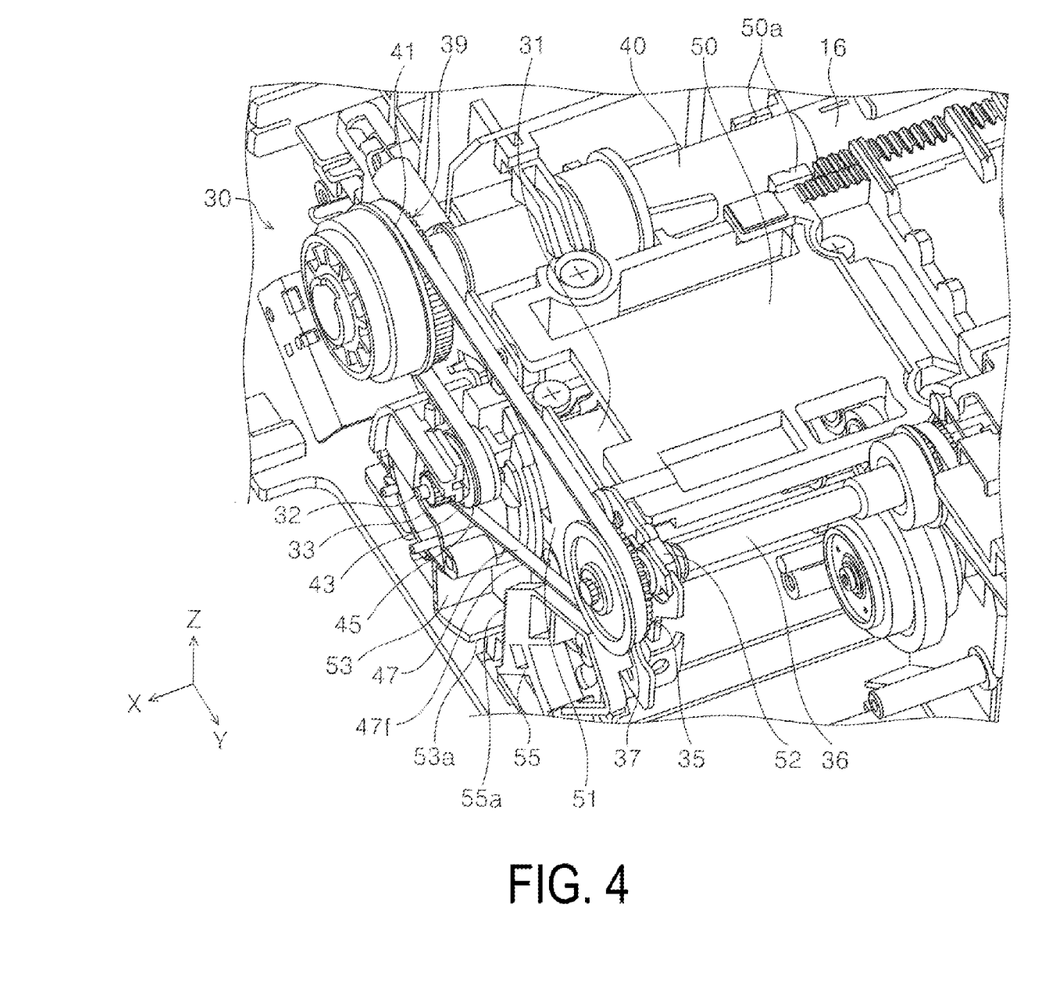
FIG. 4 is a perspective view of the power transmission mechanism.

As illustrated in FIGS. 3 and 4, the pulleys include a first pulley 35, a second pulley 39, a third pulley 43, and a fourth pulley as a driving pulley 33 in the present embodiment. The first pulley 35 and the second pulley 39, the second pulley 39 and the third pulley 43, the third pulley 43 and the driving pulley 33, and the driving pulley 33 and the first pulley 35 are in an adjacent relationship and form linear belt sections.

The first pulley 35, the second pulley 39, and the third pulley 43 are driven pulleys that are driven and rotated, and the driving pulley 33 is a driving pulley that rotates by itself by power of the motor 31.

In the present embodiment, the endless belt 47 is a toothed belt having teeth formed therein in a lengthwise direction of the belt. Additionally, the first pulley 35, the second pulley 39, and the driving pulley 33 are toothed pulleys that engage with the teeth of the endless belt 47. The third pulley 43 is a pulley on which teeth are not formed.

However, the endless belt 47 is not limited to the toothed belt, and may not have teeth formed. Further, each of the pulleys is not limited to the toothed pulley, and may not have teeth formed.

In the present embodiment, the drive transmission device 30 further includes a first rotation shaft 36, a second rotation shaft 40, a third rotation shaft 44 (refer to FIG. 5), a first bearing part 52, and a second bearing part 50a.

Further, in the present embodiment, the drive transmission device 30 further includes a main frame 50, a side frame 51, a swing member 53, a tension coil spring 54, and a fixing member 55.

The drive transmission device 30 is provided on a side portion in the +X direction of the main frame 50 constituting a base body of the printer 1.

The first rotation shaft 36 which is a rotation shaft of the first pulley 35 is pivotally supported by the first bearing part 52. The first bearing part 52 is provided on the side frame 51 provided on a side surface of the main frame 50 in the +X direction.

The first pulley 35 is provided at a shaft end of the first rotation shaft 36 in the +X direction. Then, the shaft end of the first rotation shaft 36 in the +X direction is a free end with respect to the first bearing part 52.

The second rotation shaft 40 which is a rotation shaft of the second pulley 39 is pivotally supported by the second bearing part 50a. The second bearing part 50a is integrally formed with the main frame 50.

The second pulley 39 is provided on a shaft end of the second rotation shaft 40 in the +X direction. Then, the shaft end of the second rotation shaft 40 in the +X direction is a free end with respect to the second bearing part 50a.

The driving pulley 33 is mounted on a motor shaft 32 of the motor 31.

The third pulley 43 is a pulley that imparts tension to the endless belt 47. The third pulley 43 is rotatably supported via the third rotation shaft 44 (refer to FIG. 5) with respect to the swing member 53. The swing member 53 is a member that swings coaxially with the motor shaft 32 by a bearing part (not illustrated), and is pressed in a clockwise direction of FIG. 3 by a tension coil spring 54 which is an example of a pressing member.

The fixing member 55 is provided in a position adjacent to the swing member 53. The swing member 53 is fixed not to rotate by a tooth part 55a being formed on the fixing member 55 and a protruding restriction part 53a formed on the swing member 53 engaging with the tooth part 55a.

The first pulley 35, the second pulley 39, and the driving pulley 33 are in contact with an inner surface of the endless belt 47, that is, a surface thereof on which the teeth are formed, and the third pulley 43 is in contact with an outer surface of the endless belt 47, that is, a surface thereof on which the teeth are not formed. With such a configuration, the third pulley 43 imparts tension to the endless belt 47 by pushing the endless belt 47 inside the endless belt 47, and thus an increase in a size of the drive transmission device 30 can be suppressed.

In the first pulley 35, the first flange 37 is formed in the +X direction, and a side surface of the first flange 37 in the −X direction faces a side surface 47f of the endless belt 47 in the +X direction.

Further, in the second pulley 39, the second flange 41 is formed in the +X direction, and a side surface of the second flange 41 in the −X direction faces the side surface 47f of the endless belt 47.

Further, in the third pulley 43, the third flange 45 is formed in the +X direction, and a side surface of the third flange 45 in the −X direction faces the side surface 47f of the endless belt 47. In the third pulley 43, a flange is also formed on a side surface thereof in the −X direction, but description thereof will be omitted below.

In the present embodiment, the flange is not formed on the driving pulley 33.

Figure 5:
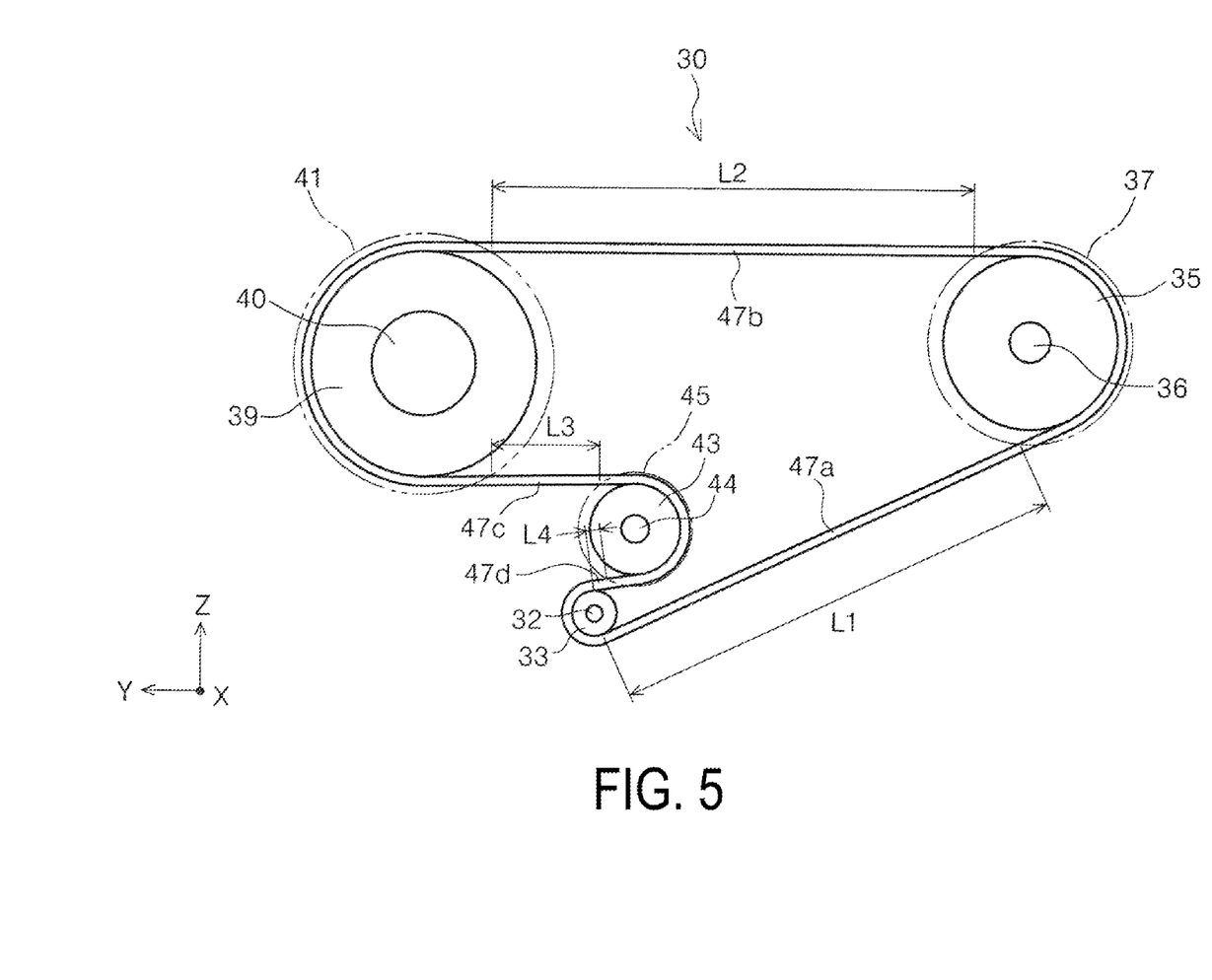
FIG. 5 is a front view of the power transmission mechanism.

Next, as illustrated in FIG. 5, a plurality of linear belt sections each formed between two of the pulleys are formed in the endless belt 47.

A first belt section 47a is a belt section formed between the driving pulley 33 and the first pulley 35, and a reference sign L1 is a length of the first belt section 47a.

A second belt section 47b is a belt section formed between the first pulley 35 and the second pulley 39, and a reference sign L2 is a length of the second belt section 47b.

A third belt section 47c is a belt section formed between the second pulley 39 and the third pulley 43, and a reference sign L3 is a length of the third belt section 47c.

A fourth belt section 47d is a belt section formed between the third pulley 43 and the driving pulley 33, and a reference sign L4 is a length of the fourth belt section 47d.

The length of each of the belt sections is a length of a free region in which the endless belt 47 does not come into contact with the flange or pulley.

In the present embodiment, the length L2 of the second belt section 47b is the longest among the belt sections. Next, the length L1 of the first belt section 47a is long, and then the length L3 of the third belt section 47c is long. The length L4 of the fourth belt section 47d is the shortest.

Here, as described above, since the shaft end of the first rotation shaft 36 on which the first pulley 35 is provided is a free end, and the shaft end of the second rotation shaft 40 on which the second pulley 39 is provided is a free end, both have a so-called cantilever structure. As a result, the first rotation shaft 36 and the second rotation shaft 40 have a structure in which they are easily bent toward the inside of the endless belt 47.

Figure 6:
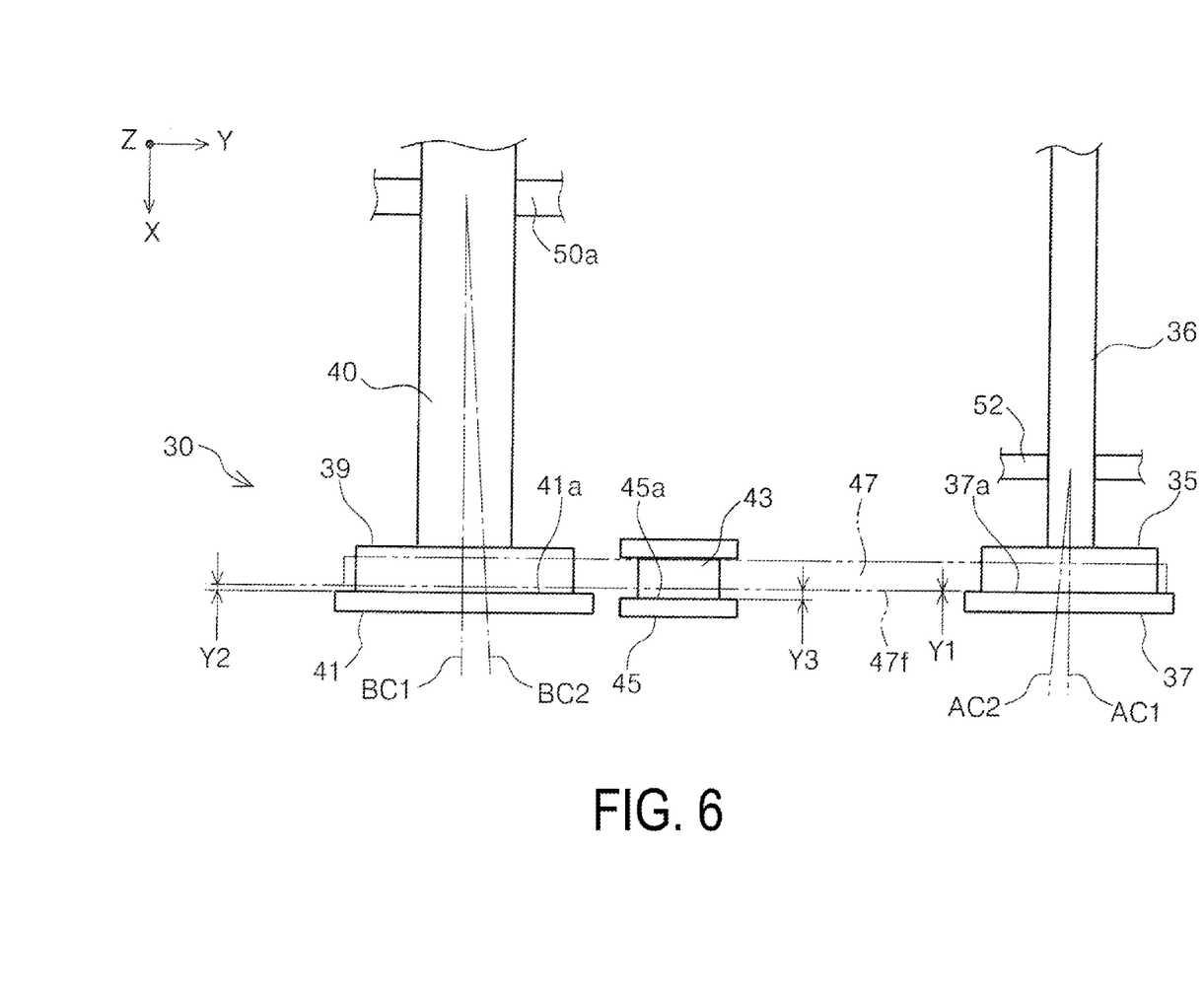
FIG. 6 is a plan view of the power transmission mechanism.

In FIG. 6, a line AC1 is an axial center line of the first rotation shaft 36 in which the bending does not occur, and a line BC1 is an axial center line of the second rotation shaft 40 in which the bending does not occur. When the first rotation shaft 36 is bent by the tension of the endless belt 47, the first rotation shaft 36 and the second rotation shaft 40 are both bent toward the inside of the endless belt 47, and thus in the first rotation shaft 36, a shaft center line on the shaft end side from the first bearing part 52 is indicated by the line AC2. Similarly, in the second rotation shaft 40, the shaft center line on the shaft end side from the second bearing part 50a is indicated by the line BC2.

In all the pulleys included in the drive transmission device 30, the axial center lines of the rotation shafts are all parallel to the X-axis direction in an initial state of assembly.

As described above, when the first rotation shaft 36 and the second rotation shaft 40 are bent, the first pulley 35 and the second pulley 39 are inclined toward the inside of the endless belt 47, and thus the endless belt 47 moves in the +X direction. Then, due to such movement of the endless belt 47, the endless belt 47 strongly comes into contact with the flange provided in the pulley, and rupture of the endless belt 47 easily occurs.

The movement of the endless belt 47 in the X-axis direction may also occur due to the bending of only one of the first rotation shaft 36 and the second rotation shaft 40, that is, may occur even when only one of the first rotation shaft 36 and the second rotation shaft 40 has a cantilever structure. Further, the movement of the endless belt 47 in the X-axis direction is not limited to the bending of the first rotation shaft 36 or the second rotation shaft 40, and may also be caused by other factors such as deformation of the main frame 50.

Therefore, in the drive transmission device 30, the first flange 37 provided on the first pulley 35 which is a pulley that forms the longest second belt section 47b and is a pulley that does not form the shortest fourth belt section 47d among the plurality of belt sections has a function of restricting the movement of the endless belt 47 in the +X direction.

In FIG. 6, the side surface 47f of the endless belt 47 is in contact with the first flange 37, that is, a gap Y1 between the first flange 37 and the side surface of the endless belt 47 is zero. Of course, the gap Y1 does not need to be zero. Also, a gap Y2 is a gap between the second flange 41 and the side surface 47f of the endless belt 47, and a gap Y3 is a gap between the third flange 45 and the side surface 47f of the endless belt 47. In the present embodiment, as an example, the gap Y2 is smaller than the gap Y3.

The gap Y1 is set to be further smaller than the gap Y2 that is smaller among the other gaps Y2 and Y3, and thus the first flange 37 has a function of restricting the movement when the endless belt 47 tries to move in the +X direction.

Here, in the endless belt 47, as the length of the belt section becomes shorter, when the flange is provided on the pulley that forms the belt section, the endless belt 47 strongly comes into contact with the flange, and the rupture of the endless belt 47 easily occurs.

However, as described above, the first flange 37 having the smallest gap from the side surface 47f of the endless belt 47, that is, the first flange 37 that restricts the movement of the endless belt 47 in the axial direction (the X-axis direction) when the endless belt 47 rotates is provided on the first pulley 35 which is a pulley that forms the longest second belt section 47b and does not form the shortest fourth belt section 47d among the plurality of belt sections. Thus, a force with which the endless belt 47 comes into contact with the first flange 37 can be suppressed, whereby the movement of the endless belt 47 in the axial direction (the X-axis direction) can be restricted while the rupture of the endless belt 47 is suppressed.

Although the restriction of the movement of the endless belt 47 in the +X direction is most contributed by the first flange 37, the endless belt 47 may come into contact with another flange, and the other flange may restrict the movement of the endless belt 47 in the +X direction to some extent.

In addition, in the present embodiment, since the first pulley 35 forms the longest second belt section 47b and the next longest first belt section 47a among the plurality of belt sections, the force with which the endless belt 47 comes into contact with the first flange 37 can be further suppressed, and thus the rupture of the endless belt 47 can be more reliably suppressed.

Further, in the present embodiment, an outer diameter of the first pulley 35 is greater than a minimum outer diameter in the plurality of pulleys. In the present embodiment, as for the outer diameter of the pulley, the second pulley 39 is the largest, the first pulley 35 is the next largest, then, the third pulley 43 is the next largest, and the driving pulley 33 is the smallest. The outer diameter of the pulley is an outer diameter of a cylindrical portion, on which the endless belt 47 is wound, rather than an outer diameter of the flange.

Here, as the outer diameter of the pulley becomes smaller, the outer diameter of the flange is reduced, and thus when the endless belt 47 comes into contact with the flange, stress is likely to be concentrated, and the rupture of the endless belt 47 is likely to occur.

However, as described above, since the outer diameter of the first pulley 35 is larger than the minimum outer diameter in the plurality of pulleys, the rupture of the endless belt 47 due to the stress concentration described above can be suppressed.

In the present embodiment, as described above, since the shaft end of the first rotation shaft 36 on which the first pulley 35 is provided is a free end with respect to the first bearing portion 52, and the shaft end of the second rotation shaft 40 on which the second pulley 39 is provided is a free end with respect to the second bearing portion 50a, both have a so-called cantilever structure and are easily bent due to the tension of the endless belt 47. Thus, although the movement of the endless belt 47 in the +X direction described above is likely to occur, and rupture of the endless belt 47 is likely to occur due to the strong contact of the endless belt 47 with the flange, as described above, since the flange (the first flange 37) for restricting the movement of the endless belt 47 in the +X direction is provided on the first pulley 35, the movement of the endless belt 47 in the axial direction (the X-axis direction) can be restricted while the rupture of the endless belt 47 is suppressed.

In addition, in the present embodiment, since the first pulley 35 and the second pulley 39 form the longest second belt section 47b, and both the gap Y1 between the first flange 37 and the endless belt 47 and the gap Y2 between the second flange 41 and the endless belt 47 are smaller than the gap Y3 between the third flange 45 of the third pulley 43 and the endless belt 47, the force with which the endless belt 47 comes into contact with the first flange 37 and the force with which the endless belt 47 comes into contact with the second flange 41 can be suppressed, and thus the movement of the endless belt 47 in the axial direction (the X-axis direction) in each of the flanges can be suppressed, while the rupture of the endless belt 47 is suppressed.

The drive transmission device 30 described above can be deformed as follows.

(1) The flange that restricts the movement of the endless belt 47 in the +X direction may be the second flange 41 provided on the second pulley 39. That is, the gap Y2 in FIG. 6 may be the smallest gap. In this case, the second flange 41 is provided on the second pulley 39 that has the maximum outer diameter in the plurality of pulleys. Thus, the rupture of the endless belt 47 due to the stress concentration described above can be more reliably suppressed.

(2) The third pulley 43 may be provided to be displaceable in the axial direction (the X-axis direction). For example, an axial dimension of the third rotation shaft 44 is greater than a width of the third pulley 43 (a width in the X-axis direction), and the third pulley 43 is provided to be slidable with respect to the third rotation shaft 44. At this time, in FIG. 6, the third pulley 43 is displaceable in the axial direction (the X-axis direction) so that a surface 45a of the third flange 45 that faces the endless belt 47 can be located in the +X direction more than a surface 37a of the first flange 37 that faces the endless belt 47.

As a result, even when the endless belt 47 is moved in the +X direction due to the bending of the first rotation shaft 36 and the second rotation shaft 40, the force with which the endless belt 47 comes into contact with the third flange 45 when the endless belt 47 rotates is smaller than the force with which the endless belt 47 comes into contact with the first flange 37 and the force with which the endless belt 47 comes into contact with the second flange 41. As a result, the rupture of the endless belt 47 in accordance with the endless belt 47 strongly coming into contact with the third flange 45 can be suppressed.

(3) The configuration of (2) described above can be changed as follows. That is, the third pulley 43 which is the pulley that forms the shortest fourth belt section 47d and does not form the longest second belt section 47b among the plurality of belt sections formed in the endless belt 47 is provided as a displacement pulley to be displaceable in the axial direction (the X-axis direction), the force with which the endless belt 47 comes into contact with the third flange 45 when the endless belt 47 rotates is smaller than the force with which the endless belt 47 comes into contact with a flange provided in another pulley due to the displacement of the third pulley 43.

That is, as the length of the belt section in the endless belt 47 becomes shorter, when the flange is formed on the pulley that forms the belt section, the endless belt 47 strongly comes into contact with the flange, and the rupture of the endless belt 47 occurs more easily, but the pulley provided at such a position is displaced in the axial direction, and thus the rupture of the endless belt 47 can be suppressed.

(4) The plurality of pulleys included in the drive transmission device 30 include four pulleys in the present embodiment, but may include three pulleys, or may include five or more pulleys. In addition, the plurality of pulleys may not include the driving pulley, and all may be the driven pulleys. Furthermore, the plurality of pulleys may not include a pulley that imparts tension to the endless belt (corresponding to the third pulley 43 in the above-described embodiment).

As described above, the medium transport device 10 according to the present embodiment includes the drive transmission device 30 and at least one roller configured to transport a medium and driven by the drive transmission device 30.

Then, the printer 1 includes the recording head 9 configured to perform recording on a medium, and the medium transport device 10.

Additionally, the printer 1 includes the drive transmission device 30, a transport driving roller 16 driven by the second pulley 39 of the drive transmission device 30 and located upstream of the recording head 9 in the medium transport path, and a first discharge driving roller 23 driven by the first pulley 35 of the drive transmission device 30 and located downstream of the recording head 9 in the medium transport path.

The present disclosure is not intended to be limited to the above-described embodiment, and many modifications are possible within the scope of the present disclosure described in the appended claims and are also included within the scope of the present disclosure.

For example, an example in which the drive transmission device is applied to a printing device that is an example of the recording device has been described in the embodiment described above, but the present disclosure is not limited thereto. For example, in a post-processing device that performs a post-processing such as a binding process for a medium on which recording is performed, the transport roller that transports a medium may be driven by the drive transmission device described above. Also, for example, in an image reading device represented by a scanner, in the case of a flat-bed type scanner, a belt mechanism for moving a reading sensor, which extends in a main scanning direction, in a sub-scanning direction may be configured of the drive transmission device described above. In a case in which the scanner includes a sheet feed mechanism, the transport roller that transports a document may be driven by the drive transmission device described above.

What is claimed is:

1. A drive transmission device comprising:
a plurality of pulleys including three or more pulleys; and
an endless belt stretched over the plurality of pulleys, wherein
the endless belt includes a plurality of linear belt sections, and
each linear belt section of the plurality of linear belt sections is formed between two pulleys of the plurality of pulleys, wherein
a first flange is provided on a first pulley of the plurality of pulleys,
the first pulley forms a longest linear belt section among the plurality of linear belt sections and the first pulley does not form a shortest belt section among the plurality of linear belt sections, and in a state where the first flange is in contact with a side surface of the endless belt,
a gap is between a second flange provided on a second pulley of the plurality of pulleys and the side surface of the endless belt.

2. The drive transmission device according to claim 1, wherein the first pulley forms the longest linear belt section and a next longest linear belt section among the plurality of linear belt sections.

3. The drive transmission device according to claim 1, wherein a first outer diameter of the first pulley is larger than a minimum outer diameter of the plurality of pulleys.

4. The drive transmission device according to claim 3, wherein the first outer diameter of the first pulley is greater than or equal to a second outer diameter of another pulley of the plurality of pulleys.

5. The drive transmission device according to claim 1, comprising:
the second pulley of the plurality of pulleys, wherein the second pulley forms the longest linear belt section together with the first pulley;
a first rotation shaft as a rotation shaft of the first pulley and in which the first pulley is provided on a first shaft end of the first rotation shaft;
a second rotation shaft as a rotation shaft of the second pulley and in which the second pulley is provided on a second shaft end of the second rotation shaft;
a first bearing part configured to receive the first rotation shaft on a position of the first rotation shaft that is different from the first shaft end; and
a second bearing part configured to receive the second rotation shaft on a position of the second rotation shaft that is different from the second shaft end, wherein
at least one of the first shaft end of the first rotation shaft and the second shaft end of the second rotation shaft is a free end.

6. The drive transmission device according to claim 5, wherein the first shaft end of the first rotation shaft is a free end and the second shaft end of the second rotation shaft is a free end.

7. The drive transmission device according to claim 5, wherein the plurality of pulleys includes
a third pulley that applies tension to the endless belt and is adjacent to the second pulley, and
a fourth pulley provided on a driving shaft of a motor and is adjacent to the third pulley and the first pulley,
a length of the plurality of linear belt section increases, from a linear belt section between the third pulley and the fourth pulley, a linear belt section between the second pulley and the third pulley, a linear belt section between the first pulley and the fourth pulley, and a linear belt section between the first pulley and the second pulley, in this order,
outer diameters of the first pulley and the second pulley are larger than an outer diameter of the third pulley, the outer diameter of the third pulley is larger than an outer diameter of the fourth pulley,
the second flange that faces the side surface of the endless belt is provided on the second pulley,
a third flange that faces the side surface of the endless belt is provided on the third pulley, and
both the gap between the first flange and the side surface of the endless belt and the gap between the second flange and the side surface of the endless belt are smaller than a gap between the third flange and the side surface of the endless belt.

8. A recording device comprising:
a recording part configured to perform recording on a medium;
the drive transmission device according to claim 6;
an upstream roller driven by the second pulley of the drive transmission device and located upstream of the recording part in a medium transport path; and
a downstream roller driven by the first pulley of the drive transmission device and located downstream of the recording part in the medium transport path.

9. A medium transport device comprising:
the drive transmission device according to claim 1; and
at least one roller configured to transport a medium and driven by the drive transmission device.

10. A recording device comprising:
a recording part configured to perform recording on a medium; and the medium transport device according to claim 9.

11. The drive transmission device according to claim 1, wherein the first pulley forms the longest linear belt section with the second pulley of the plurality of pulleys, wherein an outer diameter of the second pulley is largest among outer diameters of the plurality of pulleys.

12. The drive transmission device according to claim 1, the plurality of pulleys includes a driving pulley, the driving pulley being adjacent to the first pulley, wherein a linear belt section of the plurality of linear belt sections is formed between the first pulley and the driving pulley, and wherein an outer diameter of the driving pulley is smallest among outer diameters of the plurality of pulleys.

13. A drive transmission device comprising:
a driving pulley driven by a drive source;
a plurality of driven pulleys, the plurality of driven pulleys including a first pulley, a second pulley adjacent to the first pulley, and a third pulley adjacent to the second pulley;
an endless belt stretched over the driving pulley and the plurality of driven pulleys;
a first rotation shaft as a rotation shaft of the first pulley and in which the first pulley is provided on a first shaft end;
a second rotation shaft as a rotation shaft of the second pulley and in which the second pulley is provided on a second shaft end;
a first bearing part configured to receive the first rotation shaft; and
a second bearing part configured to receive the second rotation shaft, wherein
a shaft end of the first rotation shaft on which the first pulley is provided is a free end,
a shaft end of the second rotation shaft on which the second pulley is provided is a free end,
the first pulley has a first flange that faces a side surface of the endless belt,
the second pulley has a second flange that faces the side surface of the endless belt,
the third pulley has a third flange that faces the side surface of the endless belt,
the third pulley is provided to be displaceable in an axial direction, and
a force with which the endless belt comes into contact with the third flange when the endless belt rotates is smaller than a force with which the endless belt comes into contact with the first flange and a force with which the endless belt comes into contact with the second flange.

14. A drive transmission device comprising:
a plurality of pulleys including three or more pulleys; and
an endless belt stretched over the plurality of pulleys, wherein
the endless belt includes a plurality of linear belt sections, and
each linear belt section of the plurality of linear belt section is formed between two pulleys of the plurality of pulleys, wherein
the pulley that forms a shortest belt section and does not form a longest belt section among the plurality of linear belt sections is provided as a displacement pulley to be displaceable in an axial direction, and
due to displacement of the displacement pulley, a force with which the endless belt comes into contact with a first flange provided on the displacement pulley when the endless belt rotates is smaller than a force with which the endless belt comes into contact with a second flange provided on another pulley.

\* \* \* \* \*